April 7, 1964   W. J. McGUIRE, JR., ETAL   3,127,937
METHOD AND A COMPOSITION FOR TREATING SUBSURFACE FRACTURES
Filed Aug. 22, 1960                                   2 Sheets-Sheet 1

INVENTORS
William J. McGuire, Jr.
Loyd R. Kern
Reece E. Wyant
Thomas K. Perkins

April 7, 1964   W. J. McGUIRE, JR., ETAL   3,127,937
METHOD AND A COMPOSITION FOR TREATING SUBSURFACE FRACTURES
Filed Aug. 22, 1960   2 Sheets—Sheet 2

INVENTORS
William J. McGuire, Jr.
Loyd R. Kern
Reece E. Wyant
Thomas K. Perkins
BY
ATTORNEY

ATTEST ns">United States Patent Office 3,127,937
Patented Apr. 7, 1964

3,127,937
METHOD AND A COMPOSITION FOR TREATING SUBSURFACE FRACTURES
William J. McGuire, Jr., Dallas, Loyd R. Kern, Irving, and Reece E. Wyant and Thomas K. Perkins, Dallas, Tex., assignors to The Atlantic Refining Company, Philadelphia, Pa., a corporation of Pennsylvania
Filed Aug. 22, 1960, Ser. No. 51,078
2 Claims. (Cl. 166—42)

The present invention relates to an improved composition and method for the treatment of subsurface formation fractures. More specifically, one aspect of the present invention relates to an improved composition and method for increasing the permeability to fluids of subsurface earth formations by depositing in an existing or created fracture a porous pack of particle-form propping agent. In another aspect, the present invention relates to a composition and method adapted to selectively decrease the permeability of certain sections of a fracture and increase the permeability of another section.

It is now well known in the art of petroleum production techniques that subsurface formations containing hydrocarbons can be made more permeable and thus more readily produced if an existing fracture in the formation is propped open with a solid, particle-form propping agent or a fracture is created in the formation and similarly propped open. It is also known that the production rate of water-producing formations can be improved in the same manner and that increased injectivity of fluids into a formation can be obtained by such techniques. Generally, a fracture is created by disposing a fluid, such as water, crude oil, kerosene, gelled water, gelled crude oil, gelled kerosene or emulsions opposite the formation of interest and applying sufficient pressure to such fluid to crack the formation and form a fracture therein. Following such fracturing of the formation, a suitable solid, particle-form propping agent is carried into the fracture by suspension of such agent in a carrier fluid. Leakoff or subsequent removal of the propping agent carrier will then deposit the propping agent between the walls of the fracture and the fracture will be held open. Since even very small-grained propping agents will usually result in a higher permeability through the propped fracture than through the formation itself, the ease with which fluids can be produced from or injected into a formation containing such fractures is therefore improved.

It has been the general practice in the fracturing art to use small-grained sand as a propping agent with the most widely used material being smaller than 20 mesh or 0.03 inch in diameter. There is, however, a definite limit to the increase in permeability which can be obtained by the use of such small-grained sand since such materials either pack together very tightly or crush into small fragments at moderately high pressures. Such packing or crushing results in poor permeabilities in the sand-packed fractures which are sometimes even lower than the permeability of the formation being fractured.

The problem of poor permeability in sand-packed fractures has been overcome in accordance with application Serial No. 659,496, filed May 16, 1957 by the present inventors, of which the present application is a continuation-in-part. As set forth in application Serial No. 659,496, metallic, ceramic and plastic particles larger than 20 mesh or 0.03 inch in diameter and capable of supporting loads in excess of 40 pounds per particle without fragmentation were found to be vastly superior to conventional small-grained sand as propping agents for subsurface formation fractures. In fact, these materials were found to have such superior strength characteristics by comparison with sand that they could be deposited in a fracture in a single layer or in a sparse single layer in which the individual particles were not in physical contact with one another and the permeability of the propped fracture could be increased even more by such sparse propping. This concept of sparse propping is fully disclosed and claimed in application Serial No. 659,718, filed May 16, 1957 by the present inventors, of which the present application is also a continuation-in-part.

The utilization of such large-sized propping agents has, however, created its own problems. For example, the large sizes of these materials make it difficult in many cases to properly deposit the material in the fracture, and new techniques differing radically from those which were conventional for the deposition of small-grained sand have been found necessary. Further, a number of the large-sized, noncrushable materials referred to are comparatively expensive, and one cannot utilize such materials to prop an entire fracture. One of the problems in the deposition of large-sized propping agents in a fracture is the tendency for the large particles to bridge across the wellbore. This problem is overcome in accordance with application Serial No. 35,649, filed June 13, 1960 by Loyd R. Kern. In accordance with this application, the large-sized propping agent is preceded by a mixture of small-sized propping agent and large-sized propping agent in order to plug void spaces behind the well casing which were found to be the cause of bridging. The subject application Serial No. 35,649 also discloses that the large-sized, expensive propping agents should preferably be preceded by a volume of small-sized, inexpensive material such as conventional sand. This combination of preceding large-sized propping agents with propping agents of radically different characteristics in itself creates certain problems in the introduction and deposition of materials in a fracture. One such problem is found in the propping of fractures which are oriented in a horizontal plane. In this case, it has been found that the first material injected well normally settle out near the bore-hole when conventional carrier fluids are employed and subsequent injection will simply wash channels through this settled material and deposit the later injected material, which one wishes to maintain near the well bore, through such channels and into that portion of the fracture most remote from the well bore.

Another problem encountered in the propping of subsurface fractures is encountered when vertical fractures are created, which is the general case at depths below about 3,000 feet, in an oil-producing formation which is overlain with gas and underlain with water. When a vertical fracture is formed, the fracture height is generally limited to the formation being treated by the greater strength and stress in other formations above and below the formation of interest. However, no practical way has been devised for confining a vertical fracture to a portion only of a single formation. As a result, although the fracturing and propping of the fracture increase the oil production from a formation of this character, such fracturing and propping also increase the relative amounts of gas produced or water produced. It is, therefore, desirable in many cases to selectively decrease the permeability of those portions of the fracture which extends into the gas-producing and water-producing portions of the formation.

It is, therefore, an object of the present invention to provide an improved composition and method for increasing the permeability of subsurface formation fractures.

Another object of the present invention is to provide an improved method and composition for propping horizontally oriented fractures in subsurface formations.

Still another object of the present invention is to provide an improved method and composition for selectively decreasing the permeability of certain portions of a subsurface formation fracture while maintaining high permeability in other sections of such fracture.

These and other objects of the present invention will be apparent from the following detailed description when read in conjunction with the drawings, wherein.

Briefly in accordance with the present invention it has been found that horizontally oriented fractures can be made highly permeable and upper and lower portions of vertical fractures can be reduced in permeability while maintaining high permeability through the center of the fracture by depositing in a fracture a suitable particle-form solid material which has a specific gravity equal to or less than that of the carrier fluid in which the propping agent is carried into the fracture.

It has been conventional practice in the fracturing art to depend upon the suspending power of gelled fluids in order to carry propping agents into a fracture and prevent premature settling of the propping agent. There are presently dozens of such gelled fluids on the market for this purpose. However, even the best of these fluids permits conventional propping agents to settle at a fairly rapid rate under adverse conditions such as high temperature, which settling is the cause of the problems previously discussed. In addition, as such fluids pass through a fracture, their velocity decreases and their gel strength increases which in turn ultimately leads to stoppage of flow in certain sections and channeling and bypassing by later injected carrier materials. Another problem encountered in the propping of deep formations in which high temperatures are encountered is the fact that the gel strength, or suspending power, of conventional propping agent carriers breaks down quite rapidly when subjected to such high temperature conditions. These problems, incident to the use of gelled carriers, are also solved in accordance with the present invention since the particular composition and method of the present invention depends upon the relative specific gravities of the carrier fluid and the propping agent rather than the suspending power of a highly viscous or gelled fluid.

Figure 1:
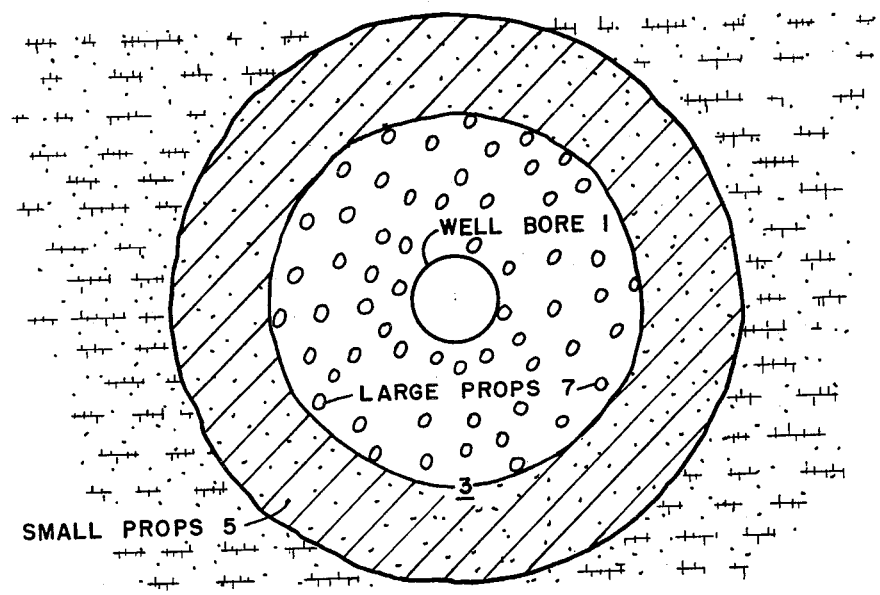
FIGURE 1 shows a cross section of a horizontally oriented fracture in a subsurface formation which fracture has been propped open with particle-form propping agents in accordance with one aspect of the present invention.

Referring specifically to FIGURE 1, there is shown a well bore 1 surrounded by a horizontally oriented fracture 3. In order to prop such a fracture with non-crushable materials such as those referred to in application Serial No. 659,496, it is highly desirable to first introduce a less expensive material, preferably of smaller size, for the purpose of propping the portion of the fracture most distant from the well bore. Since all conventional propping agents have a definite settling rate in conventional carriers or such conventional carriers cause bypassing of later injected carriers, the first material introduced into a horizontal fracture, such as that shown in FIGURE 1, will rapidly settle near the well bore rather than be carried out away from the well bore. Accordingly, the first portion of propping agent or, in this case, the small-sized propping agent will be deposited near the well bore and subsequent injection of the large-sized propping agent will simply wash channels through this bed of small propping agent and deposit the larger material in the most remote portion of the fracture. In order to overcome this difficulty, the small-sized propping agent is carried into the fracture in a carrier in which the propping agent has a specific gravity substantially equal to the carrier, thereby suspending the propping agent by the gravity in the carrier as it passes into the fracture and preventing settling near the well bore. This technique deposits the first portion of propping agent in a bed in the remote section of the fracture as shown at 5. Thereafter a suspension of large-sized props 7 having a specific gravity greater than their carrier fluid, preferably in a concentration or under conditions such as to produce a sparse population, is injected into the fracture and deposited adjacent the well bore where it is most needed and where high permeability is most advantageous.

As specified above, the first material injected is a solid, particle-form material having a specific gravity equal to or less than that of its carrier fluid. As a practical matter, unless a comparatively expensive liquid is employed, suitable carrier liquids will have a specific gravity of less than 2.0 and generally between about 0.8 and 1.6. Accordingly, the first propping agent should be a material having a specific gravity below about 2.0 and preferably one that is inexpensive. Suitable materials of this character include particles of wood and pressed wood, particles of organic materials, such as crushed nut shells, grape seeds and the like.

Inasmuch as the comparative specific gravities of the propping agent and the carrier fluid are the critical factors in carrying out the present invention, the carrier fluid need not be a gelled or viscified fluid but may be fresh water, salt water, unmodified crude oils, etc. As previously indicated, these fluids have the additional advantages of being substantially insensitive to high temperatures and their injection rates are not affected by viscous drag.

The second propping agent is a material having a specific gravity greater than its carrier and is preferably much more dense than the carrier. Preferably, this propping agent is one of the large-sized, manufactured, formable materials specified in application Serial No. 659,496 and include aluminum, steel, glass, metallic alloys and materials of like character. It is further preferred that this second propping agent be employed in concentrations or under conditions such as that a sparse population of the props is attained. Since this agent is to be deposited near the well bore, reasonable falling rates of the props in their carrier can be tolerated. Therefore, conventional gelled carriers and in some cases unmodified fluids will be suitable.

Figure 2:
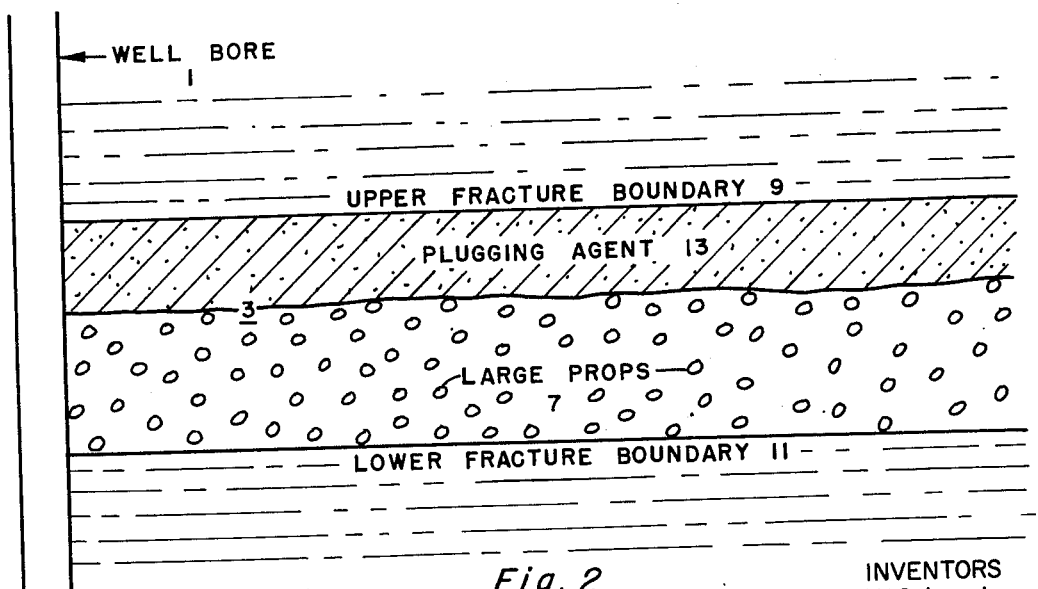
FIGURE 2 shows a cross section of a vertically oriented fracture in a subsurface formation in which an upper gas-producing section of the fracture has been plugged, and the lower, oil-producing portion of the formation, maintained in a highly permeable state.

FIGURE 2 of the drawings shows a vertically oriented fracture bounded by upper fracture boundary 9 and lower fracture boundary 11 in a subsurface formation and in which the oil in the formation is overlain by gas and it is desired to reduce the permeability of the portion of the fracture extending into the gas-bearing upper section while attaining high permeability in the lower portion of the fracture which extends into the oil-bearing section. In order to accomplish this objective, a suitable plugging material, having a specific gravity less than the specific gravity of a carrier fluid is first injected into the formation in such carrier. Due to the specific gravity relationship of the plugging agent and its carrier, the plugging agent will float to the top of the fracture and be deposited in a solid pack 13 thereby plugging the portion of the fracture which extends into the gas-producing section of the formation. Thereafter a suitable propping agent of the same character as the second propping agent of the previous example, preferably larger than 0.03 inch in diameter and also preferably in a sparse population, is suspended in a carrier and deposited in the bottom of the fracture as shown at 7 to hold that portion of the fracture open and permit oil to flow therethrough.

Plugging agents useful in accordance with this variation of the invention include any of the well known plugging materials provided they meet the specific gravity limitations set forth herein. Examples of such materials include sawdust, wood chips, and other light cellulose materials, small pieces of leather, etc.

Figure 4:
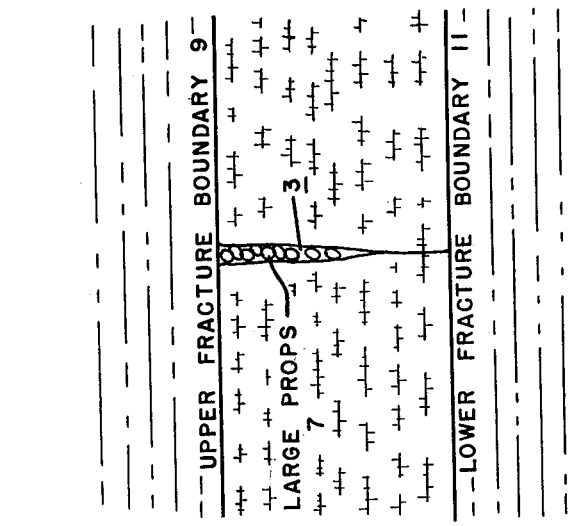
FIGURE 4 is a cross section of the fracture of FIGURE 3 taken along section line 4—4.
Figure 3:
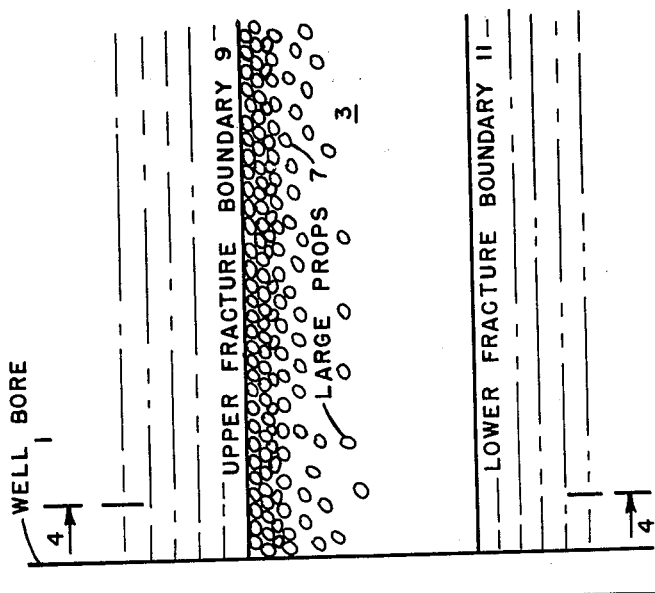
FIGURE 3 shows a vertically oriented subsurface formation fracture similar to that of FIGURE 2 except that the top portion of the fracture has been propped with a highly porous propping agent while the lower portion of the fracture has been maintained free of propping agent and permitted to close.

FIGURES 3 and 4 show a vertically oriented fracture in a subsurface formation in which the oil-bearing portion is located near the top of the formation and the oil is underlain by a water-bearing portion at the bottom of the formation. It has been found in accordance with the present invention that a formation fracture will generally close if not held open by a propping agent. This formation characteristic is taken advantage of in order to shut off bottom water in a formation by depositing a propping agent, having a specific gravity which is substantially less than that of its carrier, in the fracture. Having a wide difference in specific gravity between the proppant and its carrier, the proppant will be floated to the top of the fracture during injection and prop only the top oil-bearing section of the formation thereby leaving the bottom of the fracture closed and reduce water production. The propping agent in this case may be any of the light materials specified for use as the first propping material in the example illustrated by FIGURE 1. In addition, since this is the only propping agent employed and it is preferably employed in a large size and comparatively small amounts, materials which are relatively more expensive may be employed; for example, magnesium, oil-insoluble plastics, and other materials of low specific gravity.

It is obvious that where both gas and water production are to be reduced, a combination of the treatments illustrated by FIGURES 2 and 3 and 4 may be employed. In this case, the low specific gravity plugging agent referred to in connection with the example of FIGURE 2 would be introduced first and this would be followed by the low specific gravity propping agent as specified in the example of FIGURES 3 and 4.

It will also be obvious to one skilled in the art that the composition and method described in connection with FIGURES 3 and 4 also provide a convenient means of depositing a sparse population of propping agent in deep, hot formations. In this case, the specific gravities of the propping agent and carrier would have specific gravities substantially equal to one another. In this manner, the necessity of utilizing conventional gelled or viscous carriers which break down at high temperatures is eliminated.

Other variations and modifications of the present invention will be apparent to those skilled in the art and the specific examples given should not be considered limiting.

We claim:
1. The method of propping fractures in a subsurface earth formation comprising injecting into said fracture a first carrier liquid containing a first solid, particle-form propping agent whose specific gravity is equal to or less than the specific gravity of said carrier liquid and thereafter injecting into said fracture a second carrier liquid containing a second solid, particle-form propping agent whose specific gravity is greater than the specific gravity of said second carrier fluid.

2. The method of reducing gas production through fractures in subsurface formations in which gas overlays oil comprising injecting into said fracture a first carrier liquid containing solid particles of a plugging agent whose specific gravity is equal to or less than said carrier liquid and thereafter injecting into said fracture a suspension of a solid, particle-form propping agent in a second carrier liquid.

References Cited in the file of this patent

UNITED STATES PATENTS

| | | |
|---|---|---|
| 2,596,845 | Clark | May 13, 1952 |
| 2,681,704 | Menaul | June 22, 1954 |
| 2,693,854 | Abendroth | Nov. 9, 1954 |
| 2,699,212 | Dismukes | Jan. 11, 1955 |
| 2,859,820 | Trott | Nov. 11, 1958 |